US010855839B1

United States Patent
Liu

(10) Patent No.: US 10,855,839 B1
(45) Date of Patent: *Dec. 1, 2020

(54) CUSTOMIZED CALL LISTS FOR VOIP SYSTEMS USING HIGH-LEVEL PROGRAMMING

(71) Applicant: 8x8, Inc., San Jose, CA (US)

(72) Inventor: Zhishen Liu, San Jose, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/580,171

(22) Filed: Sep. 24, 2019

Related U.S. Application Data

(63) Continuation of application No. 16/013,556, filed on Jun. 20, 2018, now Pat. No. 10,425,531, which is a continuation of application No. 62/523,958, filed on Jun. 23, 2017.

(51) Int. Cl.
    *H04M 3/42* (2006.01)
    *H04M 1/00* (2006.01)
    *H04L 29/06* (2006.01)
    *H04M 7/00* (2006.01)
    *G06F 8/30* (2018.01)

(52) U.S. Cl.
    CPC .......... *H04M 3/42314* (2013.01); *G06F 8/31* (2013.01); *H04L 63/0227* (2013.01); *H04M 1/006* (2013.01); *H04M 7/0084* (2013.01)

(58) Field of Classification Search
    CPC ............. H04M 3/42314; H04M 1/006; H04M 7/0084; G06F 8/31; H04L 63/0227
    See application file for complete search history.

(56) References Cited

U.S. PATENT DOCUMENTS

| 5,312,016 A  | 5/1994  | Brennan et al. |
| 5,390,232 A  | 2/1995  | Freeman et al. |
| 6,304,649 B1 | 10/2001 | Lauzon et al.  |
| 6,314,402 B1 | 11/2001 | Monaco et al.  |

(Continued)

FOREIGN PATENT DOCUMENTS

WO   0135579 A1   5/2001

OTHER PUBLICATIONS

"Cisco Hosted Unified Communications Services", Cisco Product Data Sheet, Jun. 18, 2007 (retrieved May 31, 2016) http://www.cisco.com/c/en/us/products/collateral/unified-communications/product_data_sheet0900aecd80670040.html.

*Primary Examiner* — Wayne H Cai
(74) *Attorney, Agent, or Firm* — Crawford Maunu PLLC

(57) ABSTRACT

Certain aspects of the disclosure are directed to customized communication lists for data communications systems using high-level programming. According to a specific example, a data communications server is configured to interface with a remotely-situated client entity using a first programming language. The data communications server includes a communication control engine that is configured to provide a private branch exchange (PBX) for the client entity. The communication control engine is configured and arranged to identify client-specific sets of control data derived from instructions written in a second programming language that is compatible with the first programming language, and to control communication routing by determining whether to route incoming data communications in response to a comparison of at least one feature of the incoming data communications telephone communications and the client-specific sets of control data.

18 Claims, 6 Drawing Sheets

(56) References Cited

U.S. PATENT DOCUMENTS

| | | |
|---|---|---|
| 6,643,362 B2 | 11/2003 | Hogan et al. |
| 6,772,210 B1 | 8/2004 | Edholm |
| 7,274,684 B2 | 9/2007 | Young et al. |
| 7,403,604 B2 | 7/2008 | Mundra et al. |
| 7,702,792 B2 | 4/2010 | Shaffer et al. |
| 7,711,094 B1 | 5/2010 | Olshansky et al. |
| 7,933,385 B2 | 4/2011 | Dickinson et al. |
| 8,064,909 B2 | 11/2011 | Spinelli et al. |
| 8,656,417 B2 | 2/2014 | May |
| 8,918,867 B1 | 12/2014 | Salour |
| 8,948,358 B1 | 2/2015 | Rengarajan et al. |
| 8,964,726 B2 | 2/2015 | Lawson et al. |
| 9,065,917 B1 | 6/2015 | Taliancich et al. |
| 9,137,127 B2 | 9/2015 | Nowack et al. |
| 9,160,696 B2 | 10/2015 | Wilsher et al. |
| 9,240,966 B2 | 1/2016 | Wilsher et al. |
| 9,270,833 B2 | 2/2016 | Ballai et al. |
| 9,294,433 B1 | 3/2016 | Salour |
| 9,294,515 B2 | 3/2016 | Sayko |
| 9,306,982 B2 | 4/2016 | Lawson et al. |
| 9,332,119 B1 | 5/2016 | Danis |
| 9,338,064 B2 | 5/2016 | Stratton et al. |
| 9,344,573 B2 | 5/2016 | Wolthuis et al. |
| 9,407,597 B2 | 8/2016 | Lawson et al. |
| 9,426,116 B1 | 8/2016 | Salour |
| 9,455,949 B2 | 9/2016 | Lawson et al. |
| 9,456,008 B2 | 9/2016 | Lawson et al. |
| 9,459,925 B2 | 10/2016 | Lawson et al. |
| 9,459,926 B2 | 10/2016 | Shakirzyanov et al. |
| 9,553,475 B2 | 1/2017 | Boysen, III et al. |
| 2002/0141352 A1 | 10/2002 | Fangman et al. |
| 2003/0128691 A1 | 7/2003 | Bergman et al. |
| 2003/0131132 A1 | 7/2003 | Cheng et al. |
| 2005/0084088 A1 | 4/2005 | Hamilton |
| 2005/0095981 A1 | 5/2005 | Benco |
| 2005/0164702 A1 | 7/2005 | Carlson et al. |
| 2005/0283368 A1 | 12/2005 | Leung |
| 2006/0031510 A1 | 2/2006 | Beck et al. |
| 2006/0039354 A1 | 2/2006 | Rao et al. |
| 2006/0209797 A1 | 9/2006 | Anisimov et al. |
| 2006/0221941 A1 | 10/2006 | Kishinsky et al. |
| 2006/0264208 A1 | 11/2006 | Moon et al. |
| 2006/0274723 A1 | 12/2006 | Siyavudeen et al. |
| 2006/0291450 A1 | 12/2006 | Ramachandran et al. |
| 2007/0041527 A1 | 2/2007 | Tuchman et al. |
| 2007/0047531 A1 | 3/2007 | Malhotra et al. |
| 2007/0047571 A1 | 3/2007 | Kandikonda et al. |
| 2007/0091800 A1 | 4/2007 | Corcoran |
| 2007/0115942 A1 | 5/2007 | Money et al. |
| 2007/0189481 A1 | 8/2007 | Cadiz et al. |
| 2007/0223446 A1 | 9/2007 | McMenamy et al. |
| 2008/0002820 A1 | 1/2008 | Shtiegman et al. |
| 2008/0063153 A1 | 3/2008 | Krivorot et al. |
| 2008/0095339 A1 | 4/2008 | Elliott et al. |
| 2008/0102844 A1 | 5/2008 | Zhu et al. |
| 2008/0125077 A1 | 5/2008 | Velazquez et al. |
| 2008/0175230 A1 | 7/2008 | Brand et al. |
| 2009/0003574 A1 | 1/2009 | Schneider et al. |
| 2009/0086950 A1 | 4/2009 | Vendrow et al. |
| 2009/0129374 A1 | 5/2009 | Yurchenko et al. |
| 2009/0129581 A1 | 5/2009 | Kambli et al. |
| 2009/0201916 A1 | 8/2009 | Caron et al. |
| 2009/0203375 A1 | 8/2009 | Gisby et al. |
| 2009/0238169 A1 | 9/2009 | Dalrymple et al. |
| 2009/0290701 A1 | 11/2009 | Portman et al. |
| 2009/0296687 A1 | 12/2009 | Ramanathan et al. |
| 2010/0128709 A1 | 5/2010 | Liu et al. |
| 2010/0142516 A1 | 6/2010 | Lawson et al. |
| 2010/0232594 A1 | 9/2010 | Lawson et al. |
| 2010/0267374 A1 | 10/2010 | Armstrong et al. |
| 2011/0119157 A1 | 5/2011 | Sivanathan et al. |
| 2011/0170681 A1 | 7/2011 | Kole et al. |
| 2011/0182418 A1 | 7/2011 | Anisimov et al. |
| 2011/0302557 A1 | 12/2011 | Tatsubori |
| 2011/0320550 A1 | 12/2011 | Lawson et al. |
| 2012/0069131 A1 | 3/2012 | Abelow |
| 2012/0208495 A1 | 8/2012 | Lawson et al. |
| 2012/0304245 A1 | 11/2012 | Lawson et al. |
| 2013/0072153 A1 | 3/2013 | Lawson et al. |
| 2013/0212603 A1 | 8/2013 | Cooke et al. |
| 2013/0237287 A1 | 9/2013 | Ferren et al. |
| 2013/0238338 A1 | 9/2013 | Kharod et al. |
| 2013/0290494 A1 | 10/2013 | Goudarzi et al. |
| 2013/0304929 A1 | 11/2013 | Fahlgren et al. |
| 2013/0339464 A1 | 12/2013 | Goudarzi et al. |
| 2014/0044123 A1 | 2/2014 | Lawson et al. |
| 2014/0105372 A1 | 4/2014 | Nowack et al. |
| 2014/0173078 A1 | 6/2014 | McCord et al. |
| 2014/0229289 A1 | 8/2014 | Rao et al. |
| 2014/0270109 A1 | 9/2014 | Riahi et al. |
| 2014/0331060 A1 | 11/2014 | Hayton |
| 2015/0085997 A1 | 3/2015 | Biage et al. |
| 2015/0135167 A1 | 5/2015 | Berk et al. |
| 2015/0193234 A1 | 7/2015 | Udayakumaran et al. |
| 2015/0331727 A1 | 11/2015 | Mameri et al. |
| 2016/0080220 A1 | 3/2016 | Winningham |
| 2016/0134757 A1 | 5/2016 | Ballai et al. |
| 2016/0277587 A1 | 9/2016 | Alexander et al. |
| 2016/0295017 A1 | 10/2016 | Zgardovski et al. |
| 2016/0350204 A1 | 12/2016 | Conlon et al. |
| 2016/0352790 A1 | 12/2016 | Hollingsworth et al. |
| 2016/0360033 A1 | 12/2016 | Kocan |
| 2017/0070540 A1 | 3/2017 | Combellas et al. |
| 2017/0142256 A1 | 5/2017 | Bjorsell et al. |
| 2017/0187877 A1 | 6/2017 | Smith et al. |
| 2017/0262265 A1 | 9/2017 | Kellicker et al. |

CUSTOMIZED CALL LISTS FOR VOIP SYSTEMS USING HIGH-LEVEL PROGRAMMING

OVERVIEW

Aspects of various embodiments are directed to communications and computing services. Data communications platforms have allowed individuals to transmit and/or receive communications using broadband Internet connections in place of traditional telephone lines. A data communications endpoint device can use a broadband Internet connection to connect to a data communications server that is managed by a data communications service provider. The data communications server can handle communication routing and provide other data communications services for the data communications endpoint device.

Computing servers are increasingly being used to provide various data communications services over a network including, but not limited to, routing of data communications and/or data service providers for providing communications services such as messaging, video conferencing, management of data communications exchange servers, packet switching, traffic management, website hosting, remote data storage, remote computing services, and management of virtual computing environments, among other examples. For ease of reference, the various applications, systems and services that may be provided by such computing servers may be collectively referred to as data communications services.

The use of data communications services has been widespread and significant in terms of both numbers of users and types of services being made available. This growth may be attributable to any of a wide variety of socio-economic changes such as the mobility of users of these services, the types and reduced costs of portable communications tools, and the ever-evolving technology adapting to the personal and business needs of the communications users.

For business entities, the increased use of data communications services has been particularly complex, largely due to providing the same level of personal features to users from the vantage point of each business entity's communications platform. As examples, a data communications service provider can provide such data communications services to a multitude of business entities each of which uses the provided services for a customized platform configured to provide communications services to a wide range of employees. For each such customized platform, it can be particularly burdensome for the data communications service provider to adjust and reconfigure the customized platform (of each respective business entity to which such services are being provided) each time a business entity (e.g., as requested by the entity's IT department, employee(s) or others) changes in terms of the employee's communications equipment/endpoint devices.

SUMMARY

Various example embodiments are directed to issues such as those addressed above and/or others which may become apparent from the following disclosure concerning customized communication lists for data communications systems using high-level programming.

Embodiments are directed toward methods for use in communications systems employing a data communications server operated by a communications provider, where the data communications server on the data communications provider side, is used to provide data communications services to a multitude of client entities. In such contexts, the data communications server may be referred to as a data communications provider server. In such systems, the data communications server includes one or more computer processor circuits (configured with access to databases stored in memory circuits) and configured to act as a communications-control engine for routing, processing communications and/or providing related communications services on behalf of client entities. Such client entities may be exemplified respectively as the above-noted businesses with employees ranging in number from just a few to thousands, and being located/mobile for communications services in any of a multitude of venues. In these embodiments, such methods use the communication-control engine to provide such communications services by receiving data communications from data communications endpoint devices, and identifying client-specific sets of control data (e.g., providing directives or commands with communication processing data) written in a first instruction-configurable/programmable language that is associated with a message exchange protocol that is used between the data communications routing server and data sources.

Examples of such client-specific sets of control data may include other forms of code providing data and/or instructions over an interface facilitating communication between the communications provider and the data communications endpoint devices. Such methods execute the client-specific sets of control data to make decisions on how to route communications placed by the data communications endpoint devices, and to identify a set of instructions (written in a second instruction-configurable/programmable language) associated with the routing decisions. The first and second programmable languages may be similar, in that both languages are derivatives of a same type of programmable language, but the first and second programmable languages may differ in terms of content and use. The first programmable language may identify communication processing directives provided to the communications provider by the client entity, whereas the second programmable language may identify communication routing directives as provided by the communications provider. Such methods execute the set of instructions to retrieve data from the data sources maintained by the communications provider, and provide, in response to the data, communication control functionality for the data communications placed by the endpoint device.

Certain embodiments are directed toward an apparatus for communications over one or more wide-band networks. The apparatus may comprise a data communications server configured to interface with remotely-situated client entities using a first programming language that relates to a message exchange protocol between the data communications server and data sources. The data communications server is configured as a private branch exchange (PBX) that performs communication routing to and from the remotely-situated client entities. The apparatus also comprises a communication control engine. The communication control engine may include/comprise of at least part of the data communications server and facilitates the routing of communications to and from the remotely-situated client entities. In response to receipt of a data communications directed to one of the client entities, the communication control engine is configured and arranged to identify client-specific sets of control data that relate to the message exchange protocol between the data communications server and the data sources. The client-specific sets of control data are derived from instructions written in a second programming language that is compatible with the first programming language, as described further herein. Using the client-specific sets of control data, the communication control engine is configured and arranged to control communication routing by the PBX. For instance, the communication control engine determines whether to route incoming data communications in response to a comparison of at least one feature of the incoming data communications and the client-specific sets of control data. In response to an indication that the data communications may be routed (e.g., such routing is permissive based on communication blacklists and/or communication whitelists), the communication control engine is configured and arranged to identify at least one data source that corresponds to a communication property for the data communications, and provide communication control functionality for the data communications using the data source. Similarly, in response to a determination that the data communications may not be routed (e.g., such routing is not permissive based on communication blacklists and/or communication whitelists), the communication control engine is configured and arranged to execute instructions to block the routing of the data communications.

The above discussion/summary is not intended to describe each embodiment or every implementation of the present disclosure. The figures and detailed description that follow also exemplify various embodiments.

BRIEF DESCRIPTION OF THE FIGURES

The disclosure may be more completely understood in consideration of the following detailed description of various embodiments of the disclosure, in connection with the accompanying drawings in which.

Figure 1:
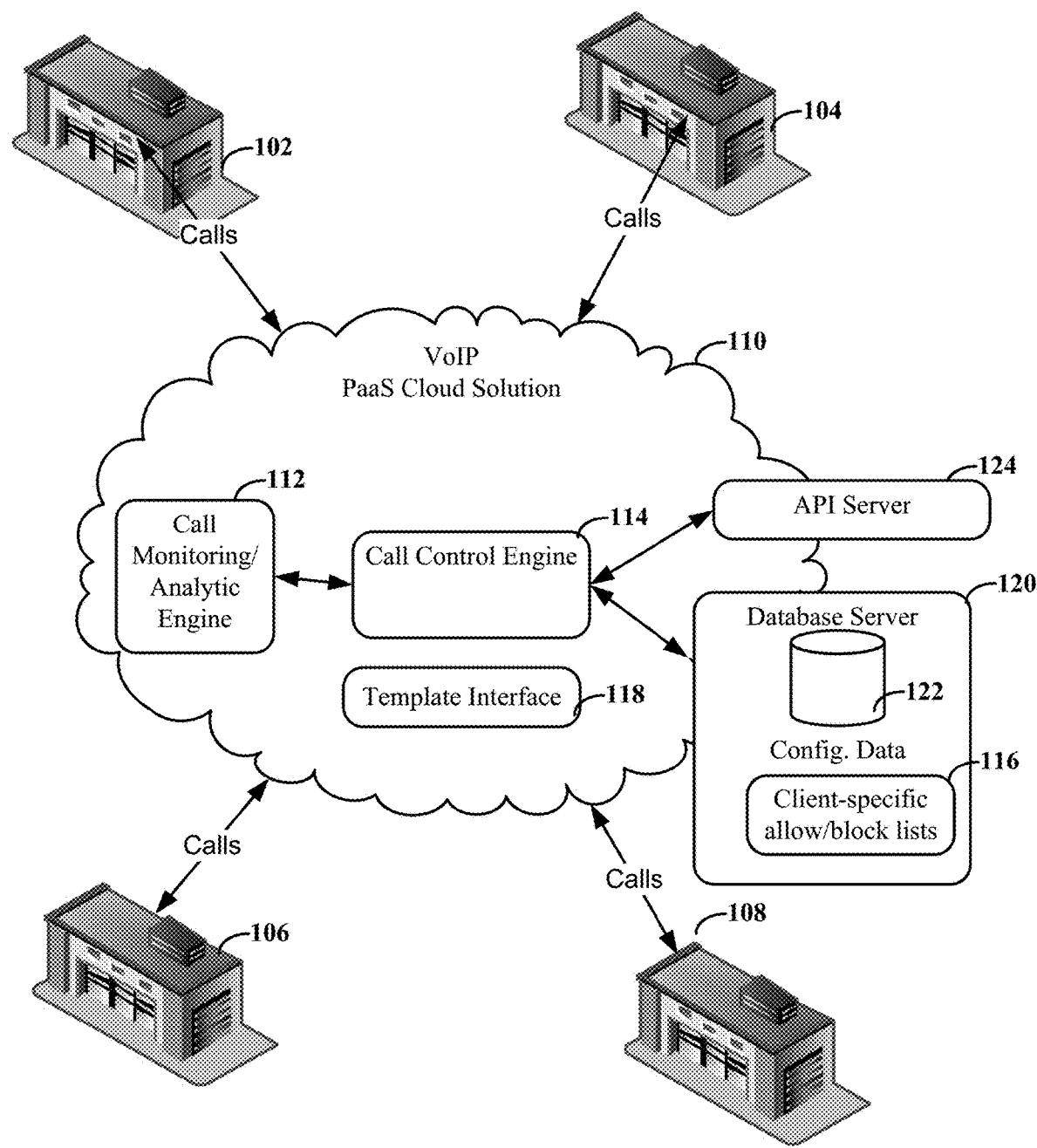
FIG. 1 depicts a diagram of a data communications system that uses high-level programming languages for management of communications services, consistent with embodiments of the present disclosure.

While various embodiments are amenable to various modifications and alternative forms, specifics thereof have been shown by way of example in the drawings and will be described in detail. It should be understood, however, that the intention is not to limit the disclosure to the particular examples and embodiments described. On the contrary, the intention is to cover all modifications, equivalents, and alternatives falling within the spirit and scope of the disclosure.

DETAILED DESCRIPTION

Aspects of the present disclosure are believed to be applicable to a variety of different types of apparatuses, systems and methods involving customized communication lists for data communications systems using high-level programming. In certain implementations, aspects of the present disclosure have been shown to be beneficial when used in the context of providing data communications services. While the present disclosure is not necessarily limited to such data communications systems as described herein, for purposes of facilitating understanding and appreciation of certain embodiments, the following discussion uses such data communications-based services and systems in the context and on behalf of communications platforms of client entities which subscribe to such services from a data communications service provider (with a server).

For ease of explanation, some examples may be primarily described with reference to data communication servers configured to provide data communication services for endpoints of a plurality of different client accounts. It is understood that the various examples may be adapted for use with computer servers configured to provide various other remote services, including, but not limited to: website hosting, remote data storage, remote computing services, virtual computing environments, enterprise communications, virtual contact center, and other services. Some remote service providers customize their services for different customers. This might include customizable auto attendants, communication routing, communication forwarding, voicemail, and customization of alerts and reminders for particular clients and/or end-users of the client. Similarly, different customers may allow or block data communications, and/or other data communications, from particular entities. For instance, some client entities may restrict incoming or outgoing communications to particular phone numbers, particular geographic locations, and/or restrict data communications at particular times. For particularly large clients with many different telephone accounts and numbers, implementing and updating these types of customizations can be a significant undertaking.

Certain embodiments of the present disclosure are directed toward an interface that allows client-specific control engines to access and dynamically adjust the manner in which remote services are provided for the users of a client account during operation, while maintaining the integrity and security of the underlying system for providing the remote services. More particularly, certain embodiments are directed toward customized communication lists for data communications systems using high-level programming. Such lists may be whitelists which define parameters within which data communications may be received and/or placed. Such lists may also be blacklists which define parameters within which data communications may not be received and/or placed. These whitelists and blacklists may be customized by customer entity, by branch extension, and/or by end-user. In such a manner, a hierarchical communication blocking architecture is described, which allows communication blocking according to whitelists and/or blacklists defined at multiple levels within an organization.

In the following description, various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the different diagrams can refer to the same elements, more specific embodiments, or additional instances of the same element. Also, although aspects and features may in some cases be described in individual figures, it will be appreciated that features from one figure or embodiment can be combined with features of another figure or embodiment even when the combination is not explicitly shown or explicitly described as a combination. For ease of explanation, some examples may be primarily described with reference to data communications servers configured to provide data communications services for endpoints of a plurality of different client accounts. It is understood that the various examples may be adapted for use with computer servers configured to provide various other remote services, including, but not limited to: website hosting, remote data storage, remote computing services, virtual computing environments, enterprise communications, virtual contact center, and other services.

According to certain embodiments, a data communication system may be configured to allow a client-specific control engine to dynamically modify and control the communication flow and processing at different levels within the system, including (re)routing of incoming communications generally and by way of private branch exchanges (PBXs) and Internet Protocol PBXs (or IP PBXs) to provide intelligent routing relative to receptionists and direct dial numbers for individuals using the IP PBXs. Within these constraints, a customer can write code that self-describes the building blocks or particular configurations used in the customer's particular application, which can be interpreted and executed by the data communications provider. In various embodiments, the building blocks or particular configurations and the data communications servers that execute the building blocks or particular configurations can be configured to interface with other sources of data and control. This can include, for example, flow control decisions that are based upon code running on the client side or on the provider side. As non-limiting examples, a client-side computer system could run code that is written using JavaScript or TCL while a server-side computer system might run code that is written using PHP: Hypertext Preprocessor (PHP), NodeJS, Python, Scala, Ruby, .Net, or other web languages.

Rules of various complexity can be used for routing incoming communications, whether to one or more receptionists, directly to extensions, to voicemail, or for other communication routing purposes. The logic used for the routing decisions can be based upon directives and related data shared across multiple PBXs, data that can be dynamically changed, and upon rules and logic that can be defined according to multiple tiers of communication routing decisions. For example, a large company may have many different offices or store locations. Portions of the communication routing and processing can be shared across the entire company. Other portions could be shared with subsets or groups (e.g., groups based upon geographic regions, countries or based upon different company divisions). Still further, portions can be set based upon individuals being contacted. Such aspects can facilitate the configuration, management, and updating the data communication system, particularly in situations where there are many thousands of extension rules which can be a difficult proposition.

A client entity may desire to allow and/or block data communications in differing ways. As such, custom communication blocking rules may be defined company wide as well as for individual departments, branches, end-users, and/or individual devices. Similarly, custom rules may be defined that describe circumstances under which data communications may be accepted (e.g., allowed), and such rules may be defined at varying levels in the hierarchy of the organization. As used herein, communication whitelists may generally refer to a list of defined parameters within which a data communications may be placed and/or received by a client entity. Similarly, communication blacklists may generally refer to a list of defined parameters within which a data communications may not be placed and/or received by a client entity. While customized whitelists and customized blacklists may be generated at varying levels within an organization (e.g., client entity), restrictions may also be placed on the level of customization available within the organization. A client entity may wish to provide greater authority in defining whitelists and/or blacklists to higher level entities in the organization, and less authority to lower level entities in the organization. For instance, an administrator for the client entity may have full authority to define whitelists and blacklists applicable to the entire company, whereas a manager for a particular branch extension may have limited authority to define whitelists and blacklists applicable to that particular branch extension. Yet further, an individual end-user within the client entity may have further limited authority to define whitelists and blacklists applicable to that particular end-user.

According to certain embodiments, the data communication system provides inbound and outbound communication routing for one or more PBXs. A PBX is a telephone system that switches calls between enterprise users on local lines while allowing all users to share a certain number of external phone lines. External phone lines are telephone lines that are supported by telephone carriers as being individually addressable within the public switched telephone network (PSTN). For example, a PBX can use extensions to direct calls to many phones after a caller first makes a call to a shared number. As another example, a PBX can provide direct Inward Dialing (DID) as a service where a telephone carrier provides a block of telephone numbers that are each routed to an IPBX system rather than to individual telephone lines. Using DID, individual phone numbers can be provided to each person or workstation without separate physical lines tied into the IPBX for each possible connection.

According to certain example embodiments, a data communications system is configured as a Platform as a Service (PaaS) that provides a user with access to, among other things, telephone communication routing control, PBX functions, computer telephony integration (CTI), and data analytics (in this context the user can refer to, e.g., person, group, server or CPU, or subscribing business entity). The term "PaaS" refers to Platform as a Service, as exemplified in the context of data communications systems. PaaS or application platform as a service (aPaaS) is a category of cloud computing services that provides a platform allowing customers to develop, run, and manage applications without the complexity of building and maintaining the infrastructure typically associated with developing and launching an application. PaaS can be delivered as a public cloud service from a provider, where the consumer controls software deployment with minimal configuration options, and the provider provides the networks, servers, storage, OS, 'middleware' (e.g. Java runtime, .NET runtime, integration, etc.), database and other services to host the consumer's application. Similarly, PaaS can be delivered as a private service (software or appliance) inside the firewall, or as software deployed on a public infrastructure as a service.

Embodiments of the present disclosure are directed toward an interface that allows users of the data communications system solution to access data communications capabilities of the underlying system, including its hardware and software components, while maintaining the integrity and security of the underlying system. Particular embodiments are directed toward a communications solution that allows for customization of whitelists and/or blacklists at multiple levels within a hierarchical organization. The whitelists and/or blacklists may be adaptive, in that the criteria that determine whether a data communications will be allowed or blocked may change according to time of day, a location of a user, and/or workload of a particular server, among other examples. In some instances, an exception to the whitelists and/or blacklists may be granted. The circumstances under which an exception may be granted may be defined by the client entity, and the incidence of such exceptions may be monitored. In such a manner, the client entity can limit who can grant exceptions to whitelists and/or blacklists, when such exceptions may be granted, and how frequently such exceptions are granted (or, requested and not granted, as the case may be).

The ability to access the underlying data communications services, including communication routing and communication control engines, can provide a platform that is both flexible and simple to implement from the viewpoints of both the data communications provider and the customers of the data communications provider. The communications solution can be configured to modify communication whitelists and/or communication blacklists applicable to a particular client entity, and to control the communication flow and processing at all levels within the system, including (re)routing of incoming communications to different PBXs. When compared to an add-on type service where a communication is first handled by a separate PBX, the communications solution may offer a number of advantages and additional features including, but not limited to, increased communication routing capabilities, scalability, and reduced complexity. For instance, the communications solution allows a data communications client having multiple end-users to provide customized control for blocking and allowing communications to the end-users, without compromising the security of the underlying system or requiring additional customization by the data communications provider.

The data communications servers providing the underlying function for the data communications system can be configured to utilize a programmable (or configurable) communication protocol such as a high-level, domain-specific programming language as might be implemented with respective data communications servers providing data communications routing and IP PBX functions on respective sides of an interface configured to facilitate the communications via the defined protocol. A particular example of a data communications server may use session initiation protocol (SIP) to handle various communication functions (e.g., communication setup and tear down). However, the various embodiments discussed herein are not necessarily limited thereto. Consistent with the above and in other embodiments disclosed herein, the data communications servers can be configured to establish a portion of the communication from the data communications endpoint devices to another data communications endpoint device or to endpoints on the PSTN through use of a PSTN gateway. Each of the endpoint devices includes data communications-enabled circuitry, and may include for example, IP phones, smart phones, tablets, desktop computers, plain old telephone service (POTS) telephones, and cellular-capable devices among other example devices with circuitry configured and arranged to facilitate sending and receipt of data communications.

According to more specific example embodiments, a high-level domain-specific programmable communication protocol (e.g., specific to customer-entity domains) uses one or more languages which are defined using a markup language as the basis for the language structure. Particular implementations relate to the use of at least two domain-specific languages, one that can be used for initial communication routing and the other for providing more complex and specific communication processing functions. More particular example embodiments use an eXtensible Markup Language (XML). An XML model defines the constraints on the high-level language, including defining the set of valid commands that can be carried out by the data communications servers. Within these constraints, a customer can write XML code that self-describes the building blocks or particular configurations used in the customer's particular application. For instance, a common set of instructions, written in the high-level language (e.g., an XML language) may be provided by a data communications provider to client entities. The common set of instructions may form a template to be populated with client-specific directives, the populated template forming client-specific sets of control data that instruct the data communications provider how a particular client entity is to be configured for various data communications services. In such a manner, the data communications provider may provide a lightweight and simplified set of instructions to client entities, and client entities may provide the data communications provider with instructions to customize the virtual office services for that particular client entity.

The high-level domain-specific programmable communication protocol also allows for various different data structures to be embedded. For example, a script written in JavaScript can be embedded as character data that the data communications servers are configured to identify and execute. Unless otherwise stated, the use of XML in connection with various embodiments does not necessarily limit the corresponding embodiments, such as limiting the embodiments to the use of only an XML-based language(s). As used herein, such domain-specific programming language(s) are referred to as high-level markup languages (e.g., XML derivative languages or XML-type languages).

Various examples of such XML derivative languages are exemplified in the Appendix as attached to the underlying U.S. Provisional Patent document (Application No. 62/523, 958 filed Jun. 23, 2017) incorporated herein by reference. In certain example embodiments, two XML-type languages are implemented as a communication processing XML and a communication routing XML, respectively as XML derivative languages corresponding to XML but customized for processing data communications on the side of the interface operating on behalf of customer entities and on the other side of the interface for higher level processing (including, for example, communication routing) by the data communications service provider.

For ease of discussion, various embodiments are discussed in terms of XML, and more particularly, XML derivative languages. The skilled artisan would appreciate that each such XML-type embodiment is not necessarily limited to XML, XML derivative languages, or variants of XML. The corresponding directives, control and related communications data can be provided in documents corresponding to other languages and/or communications protocols; for example, one such programming language can be used for initial communication routing and another programming language can be used for providing more complex and specific communication processing functions. As discussed above, instead of or in combination with such high-level (e.g., XML-type) programming languages, preferably one which is both human-readable and machine-readable, these other implementations may be realized as being suitable for serving communications with different size and/or complexity metrics as needed to provide adequate communications service to customer entities.

According to particular embodiments, a communication control engine can respond to a communication, or other event, by sending requests to a web server and get derivative documents (e.g. a set of instructions) for processing (providing a set of directives or instructions for taking action), thereby operating in a stateless manner that is similar to how an Internet browser, or similar interface uses Hypertext Markup Language (HTML). The communication control engine can interpret a received derivative document to identify building blocks that are then rendered (i.e., executed). Each building block can define logic relating to one or more functions, such as for voice, communication control, and flow control logic. The communication control engine may also execute other types of code, such as JavaScript, to create dynamic content (e.g., dynamically generated) for client-side flow control. Each derivative document may have uniform resource identifier (URI) links to a web server for iterative processing, or it may include query requests for retrieving data from various sources of data. A query could be formatted for consistency with the source of the data (e.g., by using JavaScript Object Notation (JSON) to retrieve data from third party application servers or from the data communications server provider's cloud database). This information can then be used to drive communication flow or communication control functionality and decisions. As applicable to communication whitelists and communication blacklists, an incoming communication can be processed according to a high-level programming document with instructions (e.g., client-specific sets of control data) for determining whether communications route to incoming communications, or to block the incoming communications.

FIG. 1 depicts a diagram of a data communications system that uses high-level programming languages for management of communications services, consistent with embodiments of the present disclosure. The data communications platform as a service (PaaS) cloud solution 110 may be provided by a data communications server configured to interface with remotely-situated client entities (e.g., customers represented by building symbols 102, 104, 106, and 108) using a first programming language that relates to a message exchange protocol between the data communications server and data sources. Building symbols 102, 104, 106, and 108 represent different physical and logical locations for a customer of the data communications PaaS cloud solution 110. The customer might, for example, be an enterprise customer that has many thousands of individual employees and telephone extensions. In such an example, the four depicted building symbols 102, 104, 106, and 108 might be extended to hundreds or even thousands of separate locations (e.g., each corresponding to a different branch or store).

A communication control engine 114 provides communication control functions for communications to and from data communications endpoint devices of the enterprise customer. According to various embodiments, the communication control engine 114 can include a template engine that uses one or more template-based documents to handle data communications for different data communications enterprise customers. The communication control engine 114 can use communication destination information carried by a data communications to invoke a proper data communications services action (e.g., CTI or a click to dial functionality), which in some instances can be provided by a third party application server using a data communications provider's API server 124. Each enterprise customer can create and edit a template document using a template interface 118. For example, the template interface 118 can allow an enterprise customer to upload template documents as files to a cloud storage location. The enterprise customer can then edit the document files by uploading replacement files through the template interface 118. The template interface 118 might also be configured to provide a graphical user interface (GUI), whether based upon a web-browser or other application. The GUI can provide options for uploading and for directly editing the template documents within the infrastructure of the data communications PaaS cloud solution 110.

According to various embodiments, the template engine is configured to execute code within the documents, where the code is written in a high-level, domain-specific programming language. Particular example languages may include CPXML and CRXML. The programming language defines the message exchange protocol between a communication control engine 114 (e.g., a communication control server providing communication switching functions) and other sources of information, such as databases, web applications, authentication servers, and servers providing various communication-related services. For instance, a template document can be designed to implement communication control functions that are contingent upon configuration data that is stored in configuration database 122. The database server 120 that provides access to the configuration database 122 can be implemented as part of the data communications PaaS cloud solution 110, or remotely (e.g., by the enterprise customer or a third party). The template document can also be designed to access communication data relating to data communications servers and data communications endpoint devices, which can be provided by one or more communication monitoring or communication analytic engines 112.

A particular, non-limiting example of customized communication lists for data communications systems using high-level programming relates to an enterprise customer that has many (e.g., thousands) extensions, and many (e.g., hundreds) "branch or store" offices. The enterprise customer may desire to have particular calling numbers blocked at each branch, and particular calling numbers allowed at each branch. As such, the enterprise customer may create customizes templates which include communication whitelists and communication blacklists for each of the branches. The communication whitelists and/or blacklists could include criteria governing the manner in which data communications may be received. For example, the enterprise customer may provide instructions written in the high-level programming language that defines adaptive communication blocking, such that communications are blocked at a particular time of day (e.g., from 10 pm until 5 am), and/or communications are blocked based on a location of a user or a workload of a particular server, among other examples.

Additionally and/or alternatively, the enterprise customer may provide instructions written in a high-level programming language that causes implementation of a method for monitoring end-user exceptions. For instance, the instructions may implement a monitoring of end-user whitelist exceptions that are characterized to over-ride higher-level blacklist rules. In such a manner, the enterprise customer may monitor when an override instruction is added for a particular end-user or group of end-users, such that the enterprise customer may approve or disapprove the override instructions. In another non-limiting example, the instructions may monitor the frequency with which override exceptions are applied. For instance, a company may wish to block direct communications from outside to extensions in a telemarketing communication center. However, particular end-users (e.g., employees) may wish to add a daycare provider to the whitelist so the end-user may receive communications in the case of an emergency. As such, the company may provide instructions to the data communications provider that allow end-users to provide instructions to over-ride a blacklist, as well as instructions to monitor the frequency with which the blacklist exception is invoked to make sure privilege is not abused.

Consistent with various embodiments, a common template document can be created for use by all of the branch stores of the enterprise customer. The template document could be designed to request that the communication control engine 114 retrieve the dialed number from communication analytic engine 112. The template document can then construct a database query that uses the dialed number as an index that identifies customer-specific data stored in the configuration database 122. The customer-specific data may include information that is linked to the dialed number, such as the branch identification, the time zone, the language(s), status and identification of promotional messages, the country or region, and/or the number to directly reach a receptionist. The template document can then direct the communication control engine 114 to carry out communication flow and communication functions based upon the retrieved data.

For example, the template document can contain a number of conditional statements that specify different actions depending upon the retrieved data. One such action could be determining whether to route incoming data communications in response to a comparison of at least one feature of the incoming data communications and the client-specific sets of control data. The document could include a client-specific list of approved calling numbers 116 from which data communications may be received by the client entity, and a client-specific list of blocked calling numbers 116 from which data communications may not be received by the client entity. In response to the determination indicating permission to route the data communications, the communication control engine 114 can be configured and arranged to identify at least one data source that corresponds to a communication property for the data communications, and providing communication control functionality for the data communications using the data source. In response to the determination indicating to block the data communications, the communication control engine 114 can be configured and arranged to execute instructions to block the routing of the data communications.

In various implementations, the client-specific whitelists and blacklists 116 define conditions under which data communications are allowed or blocked. The programming instructions provided by the client entity and stored in configuration database 122 as client-specific sets of control data may define dynamic communications features that indicate when and how a communication is to be allowed or blocked. Such dynamic communications features including at least one of a date or time of day of the data communications, a location of the client entity, and a location of origination of the data communications. The communication control engine 114 may then determine whether to route the incoming data communications based on the dynamic communications features specified in the client-specific sets of control data. Similarly, such dynamic communications features may include a workload of a server and/or a communication volume at a particular location. In such examples, the communication control engine 114 is configured and arranged to determine whether to route the incoming data communications based on a workload of a server operated on behalf of the client entity, or a volume of communications at the particular location dialed.

According to certain embodiments, a template for a particular client entity provides a structure that defines how different end-users or groups of end-users can tailor their respective data communications services. For example, an enterprise customer could provide a customization tool (e.g., through a web interface) that provides individual employees (e.g., individual end-users) with options for defining communication whitelists and/or communication blacklists, and the manner in which they are enforced. When an employee selects different options, the customization tool updates the configuration database 122 to reflect the selected options. A store manager might use the same customization tool to configure policies for numbers associated with a particular store. For example, outgoing communications could be limited during non-standard business hours, and/or international communications could be restricted to employees at or above a particular level of management, among other options.

The database server 120 may maintain the client-specific sets of control data, including the list of approved calling numbers and the list of blocked calling numbers for each respective client entity, such as in the configuration database 122. The parameters for each client entity identifying when a communication is blocked versus allowed, may be maintained in a hierarchy in which lower level client entities inherit the list of approved calling numbers and the list of blocked calling numbers from higher level client entities. For instance, a national restaurant chain may provide a list of blocked numbers and/or conditions for blocking data communications, and such blocked numbers and/or conditions would apply to every franchise location of the restaurant chain. Each franchise location may provide additional blocked numbers and/or conditions for blocking data communications that supplement the blocked numbers and/or conditions of the restaurant chain. Yet further, individual office extensions within the franchise location may provide additional blocked numbers and or conditions for blocking data communications that supplement the blocked numbers and/or conditions of the restaurant chain, and the franchise location. In such a manner, a "lower level" entity within an organizational hierarchy can be configured with the whitelists and blacklists of "higher level" entities within the organizational hierarchy. Put another way, the database server 120 may be configured and arranged to maintain a first list of approved calling numbers for a particular client entity and a second list of approved calling numbers for a branch location of the particular client entity, where the second list of approved calling numbers includes the first list of approved calling numbers and additional approved calling numbers particular to the branch location. Yet further the database server 120 is configured and arranged to maintain a third list of approved calling numbers for an end-user of the branch location, where the third list of approved calling numbers includes the second list of approved calling numbers and additional approved calling numbers particular for the end-user.

Consistent with various embodiments of the present disclosure, the template document options can be implemented using data communications servers that are configured to utilize a high-level, domain-specific programming language. Such high-level programming language allows developers to program communication processing logic or service execution logic with both XML building blocks and JavaScript/TCL scripting languages.

According to particular embodiments, an XML engine or other component of the data communications PaaS cloud solution 110 can respond to a communication, or other event, by sending requests to a web server and get XML derivative documents (e.g. a set of instructions) for processing (providing a set of directives or instructions for taking action), thereby operating in a stateless manner that is similar to how an Internet browser, or similar interface uses Hypertext Markup Language (HTML). The XML engine can interpret a received XML derivative document to identify XML building blocks that are then rendered (i.e., executed). Each building block can define logic relating to one or more functions, such as for voice, communication control, and flow control logic. The XML engine may also execute other types of code, such as JavaScript, to create dynamic content (e.g., dynamically generated XML-derivative) for client-side flow control. Each XML derivative document may have uniform resource identifier (URI) links to a web server for iterative processing, or it may include query requests for retrieving data from various sources of data. A query could be formatted for consistency with the source of the data (e.g., by using JavaScript Object Notation (JSON) to retrieve data from third party application servers or from the data communications server provider's cloud database). This information can then be used to drive communication flow or communication control functionality and decisions.

According to various embodiments, the high-level programming language may allow a programmer access to a controlled and limited set of communication control operations and functions. The limitations on the operations can be particularly useful for allowing programming control to be placed into the hands of different clients of the provider of the data communications servers. For example, the provider can update or make other changes to how the data communications servers are configured without requiring that scripts written in the high-level language be modified to account for the changes. Moreover, the data communications servers and their data can be protected from poor programming decisions (intentional or otherwise) by tightly controlling the extent that the scripts can access the inner workings of the data communications servers.

Consistent with certain embodiments, the high-level programming language provides interface options that allow for authorization and authentication services to be accessed and used as part of the communication control functions. For example, the high-level programming language can access an authentication server to verify (and grant) access rights for certain databases or services.

According to embodiments of the present disclosure, the data communications servers can be configured to use different high-level programming languages for different functions, where each programming language has a different set of commands. For example, a first high-level programming language can be used in communication routing decisions. These communication routing decisions might, for example, identify a particular branch office or iPBX. The identified iPBX might then have additional scripts written in a second high-level programming language, where each script can be associated with a particular account or another identifiable grouping. The distinction between programming languages can be particularly useful in terms of improving the scalability of the system.

Figure 2:
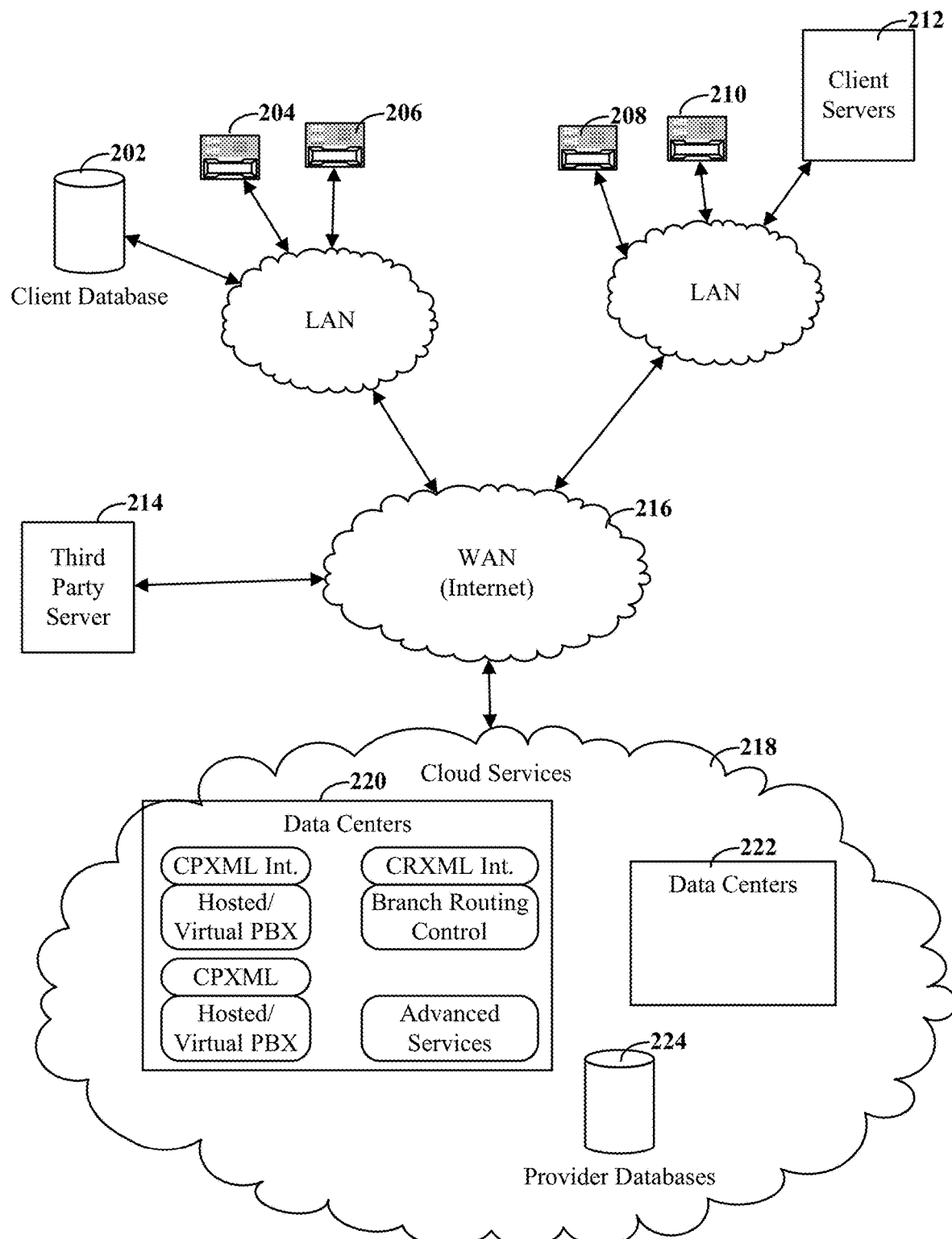
FIG. 2 is a diagram for a system that uses a high-level programming language for communication control operations, consistent with embodiments of the present disclosure.

FIG. 2 is a diagram for a system that uses a high-level programming language for communication control operations, consistent with embodiments of the present disclosure. In connection with these specifically-illustrated examples, data communications endpoint devices 204, 206, 208, and 210 are configured to place and receive data communications between other data communications endpoint devices, and also between non-data communications endpoint devices (not depicted). The depicted examples of non-data communications endpoint devices include plain old telephone service (POTS) telephones and cellular-capable devices, which might also be data communications capable (e.g., smart phones with appropriate data communications software applications). The various endpoint devices include circuitry that is specially configured to provide communications functions that include interfacing with the appropriate circuitry of the communication service provider used by the corresponding endpoint device. In many contexts a data communications-endpoint device is a data communications-capable telephone commonly referred to as IP phones. The data communications-endpoint devices can include, but are not limited to, desktop computers, mobile (smart) phones, laptop computers, and tablets. When each of the endpoint devices originates or receives a communication in a telephone network, each can be characterized or referred to as an addressable communication endpoint.

The communication routing and other services for the data communications telephone communications can be provided by one or more data communications servers. In particular example embodiments, the data communications servers can be located within one or more data centers 220, 222, which are part of a cloud services system 218. The data centers can be, for example, part of a cloud services system 218 where the hardware providing the cloud services is located in a number of different data centers with different physical locations. Consistent with embodiments, the cloud services can include SIP servers, media servers, and servers providing other services to both data communications endpoint devices and the users of the data communications endpoint devices. In some instances, the various servers, including both the data communications Servers and data analytic servers discussed herein can have their functions spread across different physical and logical components. For instance, a cloud based solution can implement virtual servers that can share common hardware and can be migrated between different underlying hardware. Moreover, separate servers or modules can be configured to work together so that they collectively function as a single unified server.

Certain embodiments are directed toward a cloud services system 218 that is configured to allow clients to create customized communication lists for data communications systems using high-level programming. The cloud services system 218 allows clients to create webpages or other software that can initiate communications with endpoint devices in response to requests received over the Internet 216. In particular embodiments, the cloud services system 218 operates as a RESTful API that allows clients to generate URI links specifying parameters for a desired communication, such as content for use with generating outgoing communications from selections made through a web interface. For instance, a client server 212 can be configured to use an API to generate a URI link that can be displayed to an end user. The URI link can contain information that identifies an endpoint device and how the endpoint device is to be contacted (e.g., by telephone communication or text message). The API generated URI link sends a communication request to the appropriate service within the data center. For example, the URI link can result in a communication with a communication control server in order to initiate a telephone communication to an endpoint device or a text message to an endpoint device.

The client server 212 may interface with the data communications provider server, such as via cloud services system 218, to adjust routing of data communications, or block communications entirely, as the case may be. The client server 212 may communicate to the data communications provider server, instructions written in a high-level programming language, including a client-specific communication blacklist and a client-specific communication whitelist.

According to various embodiments, one or more data analytics servers can monitor and analyze communication data relating to the data communications servers and data communications endpoint devices. For example, a data analytics server can be designed to track communication statistics about a variety of different communication-related parameters, such as communication duration, communication date, communication time of day, called parties, endpoint devices, selected data centers, selected carriers, dropped communications, transferred communications, voicemail access, conferencing features, and others. The high-level programming language(s) and the fata communications servers executing the languages can access these communication summary metrics and the data analytics, which can be stored in a provider database 224. For example, a script running the data communications server could direct the data communications server to query or subscribe to communication length summaries for all communications made to endpoints that are registered with the data communications server. The script could then use the information to control how, and whether, communications are routed as well as how different services are invoked. For instance, the data communications servers may receive from an extension of a client entity, instructions written in the high-level programming language to override the client-specific communication blacklist or the client-specific communication whitelist in response to satisfaction of particular criteria. The data communications provider may track communication statistics, determine when such criteria are satisfied, and determine to deny the received override instructions or apply the received override instructions based on a comparison of the override instructions with the client-specific sets of control data associated with the client entity (and stored in provider database 224).

As described herein, communication blacklists and communication whitelists may be inherited from higher levels within an organization, such as in a hierarchical communication blocking architecture. In such a manner, communication blocking according to whitelists and/or blacklists defined at multiple levels within the organization. Similarly, the conditions under which an end-user of a client entity may override such whitelists and/or blacklists may be defined by higher level entities within the organization. For instance, client-specific sets of control data stored in the provider database 224 may specify that employees below management level are prohibited from overriding communication blacklists. In such instances, the data communications server may deny application of the override instructions in response to a determination that the client-specific sets of control data prohibit application of the override instructions. Additionally and/or alternatively, the data communications server may apply the override instructions to incoming data communications directed to the extension, in response to a determination that the client-specific sets of control data do not prohibit application of the override instructions.

According to various embodiments, one or more data analytics servers can monitor and analyze communication data relating to the data communications servers and data communications endpoint devices. For example, a data analytics server can be designed to track communication statistics about a variety of different communication-related parameters, such as communication duration, communication date, communication time of day, contacted parties, endpoint devices, selected data centers, selected carriers, dropped communications, transferred communications, voicemail access, conferencing features, and others. The high-level programming language(s) and the data communications servers executing the languages can access these communication summary metrics and the data analytics, which can be stored in a provider database 224. For example, a script running the data communications server could direct the data communications server to query or subscribe to communication length summaries for all communications made to endpoints that are registered with the data communications server. The script could then use the information control how communications are routed as well as how different (client or provider) services are invoked. According to various embodiments, the database queries could be sent to a client or customer database 202.

Consistent with certain embodiments, the cloud services system 218 can be configured to interface with client servers 212 or even with third party servers 214. For instance, an XML derivative document stored by the cloud services system 218 can identify, based upon a received communication, a URI that points to client servers 212 or to a third party server 214. Data provided from these servers, e.g., in the form of a XML derivative document, can be used to specify communication routing, or other functions. In the context of communication routing to receptionists, the XML derivative document can include a URI that points to a secure server that provides information for making a routing decision. The communication control server can then make a communication routing decision based upon the information. This can add a layer of security because the data communications server does not directly access the client information.

Figure 3:
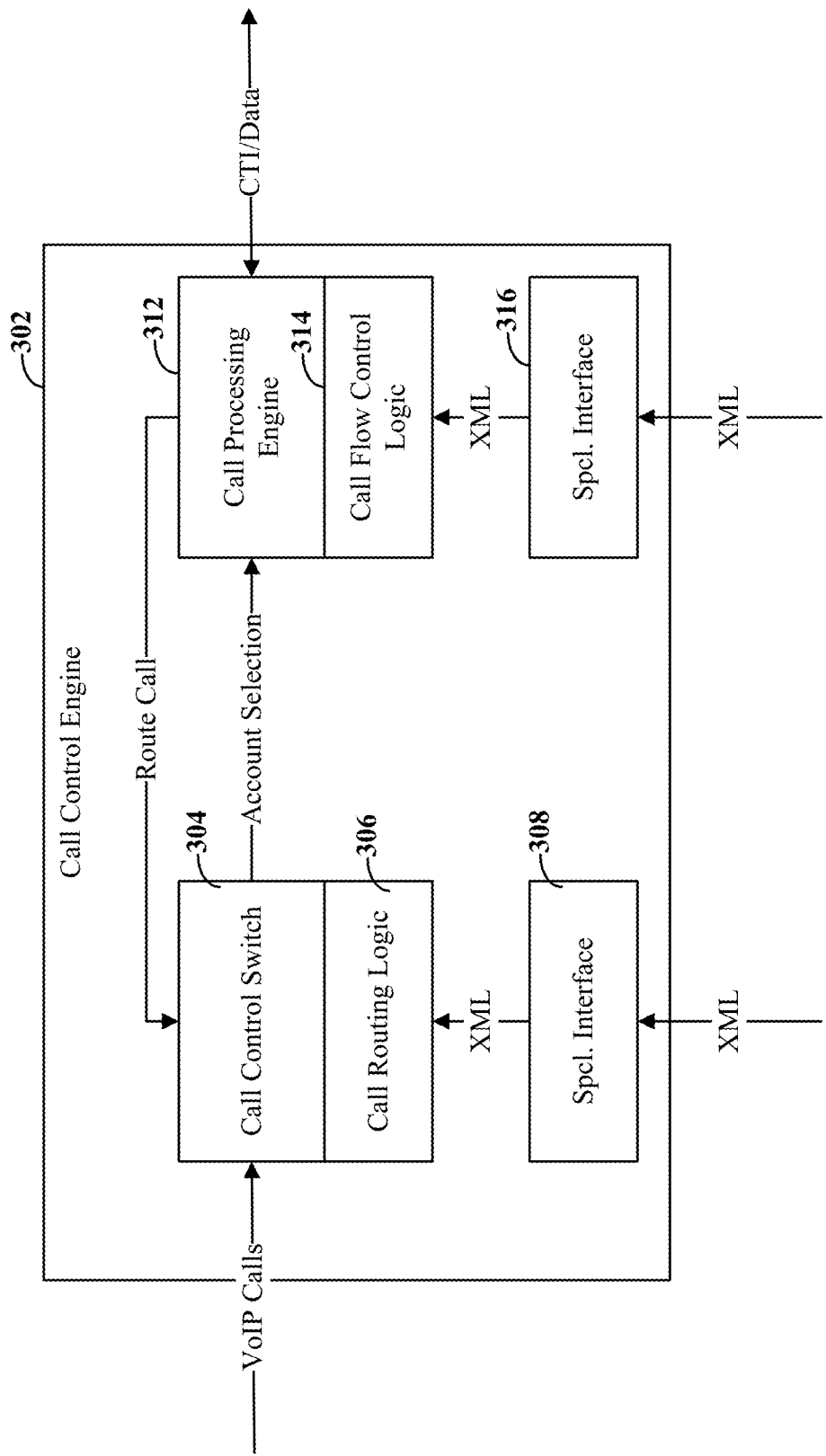
FIG. 3 is a block diagram of a communication control engine with high-level programmable language logic for two different languages, consistent with embodiments of the present disclosure.

FIG. 3 is a block diagram of a communication control engine with high-level programmable language logic for two different languages, consistent with embodiments of the present disclosure. When an incoming communication is received by the communication control engine 302, the communication can first be handled by a communication control switch 304. The communication control switch 304 can be configured to receive and process a first document that defines how the communication is subsequently routed. As discussed herein, this document can be written in a high-level programming language, such as a first XML derivative language, which provides limited access to the communication routing control logic of the communication control switch 304. First XML derivative documents can be provided to a customer through a special interface 308, which provides XML derivative documents to a communication routing logic plugin 306. The communication routing logic plugin 306 can parse and execute the first XML derivative documents while providing controlled access to the functions of the communication control switch 304.

According to various embodiments of the present disclosure, the first XML derivative language defines a limited set of commands to the communication routing logic that allow a customer to define if a communication is blocked or routed, and how the communication is initially routed (if not blocked). Maintaining the first XML derivative language as a limited set of simple building block commands can help with the efficiency of the communication control switch. For example, the communication control switch 304 can be located at the perimeter of the data communications provider's routing network, which implies that it may be called on to handle a large volume of data communications. The efficiency in processing the large volume of communications can have a significant impact on the performance of the system.

Consistent with various embodiments, the first XML derivative documents specify a first level of communication routing, and simple communication processing, that is carried out by the communication control switch 304. For example, a communication control switch 304 may provide communication routing options for multiple branch office or locations and for multiple iPBXs that support the branch locations. Each branch and iPBX may have multiple customer (user) accounts associated therewith. The first XML derivative documents can be used to determine the routing for a communication by identifying a particular branch location, a particular iPBX and particular data communications customer account and iPBX to use in subsequent routing. The initial routing decision is indicated by the arrow labelled as "account selection," which shows the passage of control to a communication processing engine 312. The communication processing engine 312 can be configured to identify and execute scripts based upon the identified account, or similar identifying information, as provided by the communication control switch 304. As discussed herein, this script can be written in a second programming language, or second XML derivative document, which provides access to the communication flow control logic of the communication processing engine 312. In certain embodiments, the second XML derivative document can include commands that support contextual communication routing and advanced communication services. The second XML derivative documents can be provided by a customer using a special interface 316, which provides received second XML derivative documents to a communication flow control logic 314. The communication flow control logic 314 can execute the second XML derivative documents while providing controlled access to the functions of the communication processing engine 312.

According to embodiments of the present disclosure, a second XML derivative document can be associated with a particular extension account (or group of extension accounts) and can be invoked when there is an incoming communication route to the extension account. The communication processing engine 312 can determine whether or not the XML derivative option has been enabled for the extension account. If enabled, then the communication flow control logic 314 can be called. Consistent with various embodiments of the present disclosure, the communication flow control logic 314 and the communication routing logic plugin 306 are each implemented as plugin applications that interface with the communication control engine according to their respective XML-defined parameters.

In certain embodiments, the communication processing engine 312 can have the capability to provide feedback to the communication control switch 304. For example, an XML derivative document for a particular account may specify a condition that, if satisfied, blocks the communication entirely or routes a communication to a different branch office. The communication processing engine 312 is configurable, through one or more XML derivative commands, to provide an indication of a new communication route decision as feedback to the communication control switch 304. The communication control switch 304 can respond by overriding the prior communication routing decision and rerouting the communication. The corresponding routing decision may then go to a different communication processing engine 312, which can handle the communication according to a different XML derivative document or the previously-used XML derivative document using different data to drive the communication processing and routing decisions.

Consistent with various embodiments, outbound communications, or communications originating from data communications devices supported by the communication control engine 302 and the corresponding PaaS implementation, can be routed using XML derivative language and the communication processing engine 312.

Figure 4:
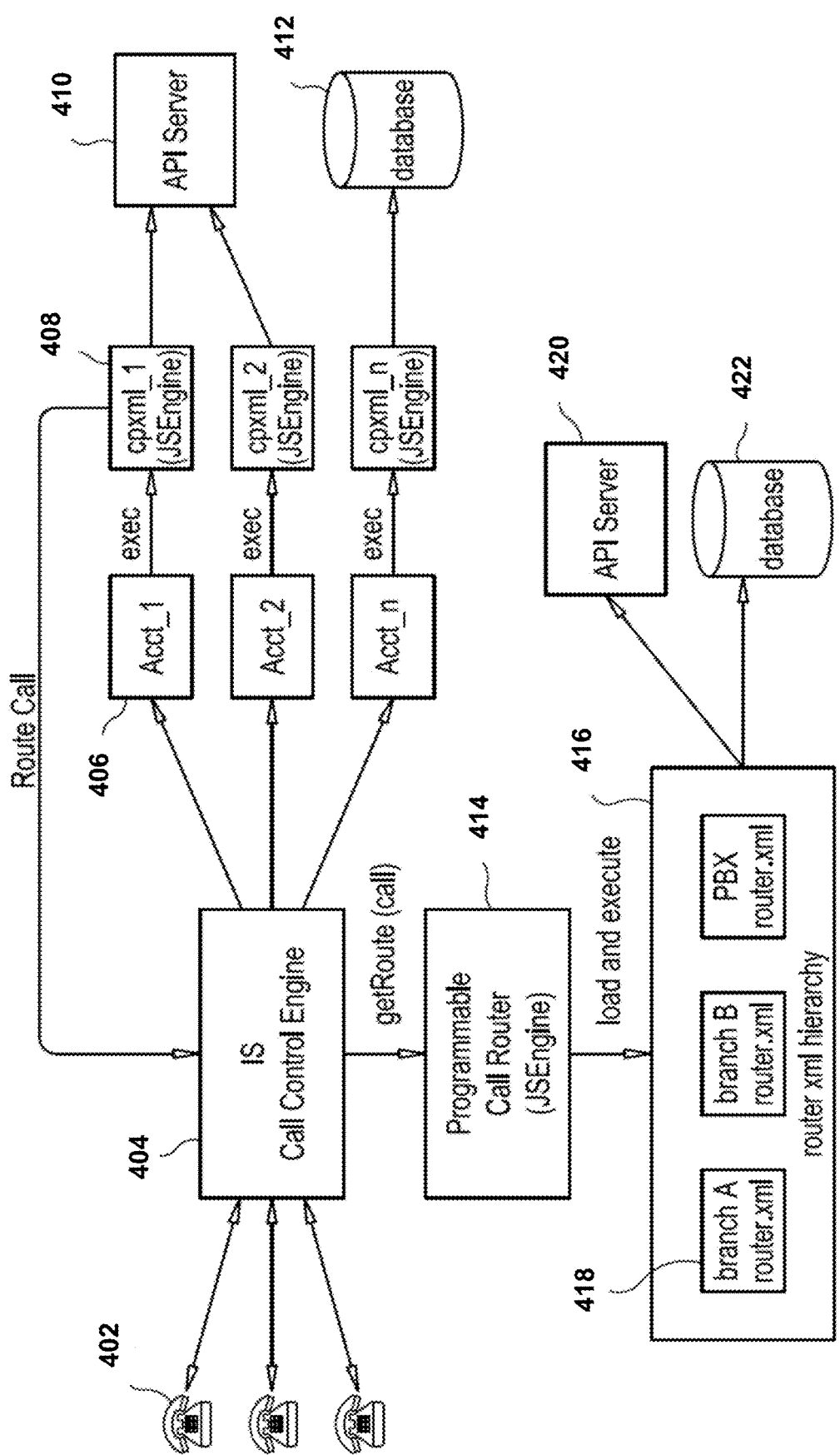
FIG. 4 is a block diagram showing a hierarchy of programmable language scripts, consistent with embodiments of the present disclosure.

FIG. 4 is a block diagram showing a hierarchy of programmable language scripts, consistent with embodiments of the present disclosure. Communication control engine 404 can provide communication flow control and routing. Consistent with various embodiments, the communication control engine 404 is an iPBX that is part of a data communications PaaS. For instance, the iPBX can provide Java-based solutions for managing data communications networks. The iPBX can be hosted by a data communications service provider and located at a data center. Various iPBX features can be provided for clients and endpoint devices 402, such as communication forwarding, remote pickup, communication routing, and voice mail.

Consistent with various embodiments, customers of a data communications provider can use the data communications PaaS by generating documents written in two different XML languages: a first XML derivative language and a second XML derivative language. Together, the documents specify how the customer would like interception rules to be handled for both inbound and outbound communications. For instance, a second XML derivative document 408 can be associated with an extension account 406, or with groups of extension accounts. The extension accounts 406 can represent a specific individual and their associated extension number(s). An XML derivative document 408 that is configured in this manner will be invoked by the communication control engine 404 after an incoming communication is routed to an extension that has XML derivative capabilities enabled. XML derivative documents can also be used for communication flow processing of outbound communications. In addition to telephone calls, other forms of messages (e.g. text messages and email messages) can be automatically generated in response to outgoing communications using commands included in the second XML derivative document. Restrictions can be placed on outbound communications based upon factors such as time of day or communication history. Such restrictions may be defined in communications blacklists. Similarly, numbers from which communications are always allowed (such as for internal customers) may be defined in communications whitelists. As described herein, communications whitelists and communications blacklists may be defined in XML derivative documents for a particular client entity.

The communication control engine 404 may also consult with communication routers 414. The communication routers can be programmed using first XML derivative documents 418, and with JavaScript for dynamic data access and logic handling. The first XML derivative documents 418 can be arranged in router XML hierarchy 416, which can specify different XML derivative documents 418 depending upon the branch or iPBX that is identified as corresponding to the communication. Once the communication router scripts are loaded, they can be cached in memory and used by the communication control engine 404 to make routing decisions. When a communication is routed through the communication control engine 404, the communication control engine can consult with branch-level XML derivative documents. The branch level can be identified, for example, based on the branch ID of a caller (for outbound calls) or callee (for inbound calls). If a route result is not determined, the communication control engine 404 can also consult with a PBX-level first XML derivative document to obtain routing decisions. Examples of a route result from a script are "Accept," "Reject," or "NewRoute." Using the first XML derivative language, the programmable communication router 414 provides the communication control engine 404 with the ability to handle communication intercept/filter reject or re-route the communication to a different target destination.

A particular example of uses for the first XML derivative documents is to provide initial routing decisions relative to a receptionist. A first XML derivative document can specify whether incoming communications are first routed to a receptionist. A few examples of how the first XML derivative rules and logic can be configured are discussed in more detail herein. If the communication control engine 404 determines that the communication is not to be first sent to a receptionist (or the communication is being forward from the receptionist), the communication control engine 404 can pass communication routing control over to the logic defined by the appropriate XML derivative document 408.

The communication router 414 can also be configured by a second XML derivative document to handle sophisticated communication flow scenarios where the communication routing is changed after the initial determination. For example, the second XML derivative can include commands (e.g., "Reroute") that, when carried out, causes the communication control engine 404 to provide feedback to the programmable communication routers 414, which use the first XML derivative for initial routing decisions. This might allow, as an example, a first XML derivative routing decision to be overridden by the second XML derivative document(s).

According to particular embodiments, the programmable communication routers (using XML derivative language) 414 can be viewed as plugins to the communication control engine 404. The communication router plugins may have two levels, Branch and PBX levels. The communication router supports XML derivative-defined structures that specify how the PaaS can be utilized by a customer. For example, the XML derivative language can define sets of conditional statements, data access requests, and communication routing commands: if/else, condition, goto, log, var, script, query, data, accept, reject, route statements, or other commands. In particular embodiments, the first XML derivative language can be considered a subset of the second XML derivative language by containing a part, but not all, of the second XML derivative language communication flow commands. This distinction can be useful for keeping the first XML derivative documents light weight so that communication routing decisions are simplified and efficient. More complex tasks, such as the use of media and advanced communication handling, can be done using a second XML derivative language and the larger set of commands. Using such programmable communication routes, a few example uses include: a school district that generates a short message service (SMS) or email notification to parents whenever an emergency number is dialed; off hour restriction of outbound communications with the second XML derivative language; communication center lockdown to provide outbound dialing restriction for phones; computer initiated dialing with caller identification (ID) override based destination database table, and communication return to target direct-inward-dial (DID)/agents; and implementation of a communication blacklist (denying communications to/from the list) or whitelist (allowing communications to/from the list) with potentially large lists and dynamic updating capabilities.

Consistent with embodiments of the present disclosure, both the first XML derivative language and the second XML derivative language provide the capability of handling dynamic data from multiple sources. Examples of these sources are depicted as application program interface (API) servers 410, 420 and databases 412, 422. The dynamic data can therefore be provided from a variety of sources including, but not necessarily limited to, communication route session data (caller id, callee id, or route from/to), query custom object (to a database) in the data communications provider system/cloud, and access data through HTTP RESTful API.

Figure 5:
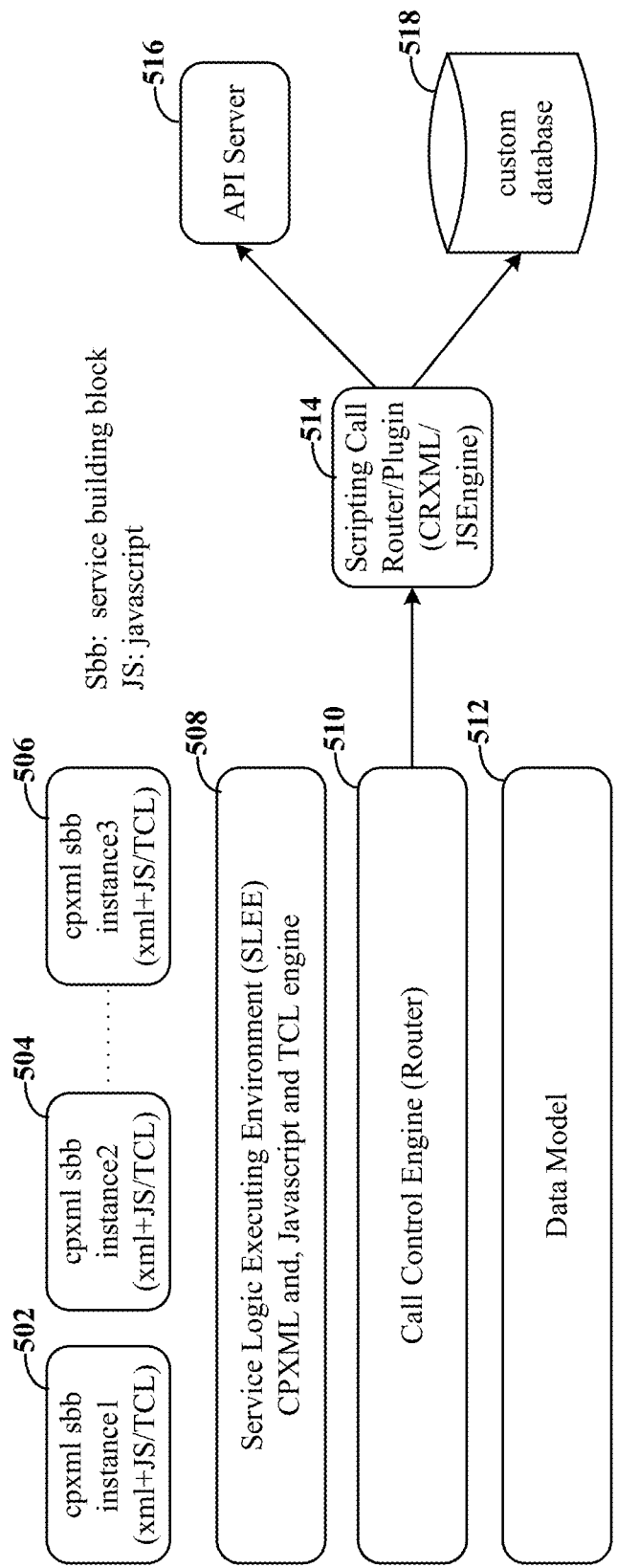
FIG. 5 is a block diagram that shows multiple conceptual layers in a communication control system, consistent with embodiments of the present disclosure.

FIG. 5 is a block diagram that shows multiple conceptual layers in a communication control system, consistent with embodiments of the present disclosure. The depicted configuration shows three sources of XML derivative documents 502, 504, 506. The service logic executing environment 508 accesses and executes the XML derivative documents 502, 504, 506. The XML derivative documents can be embedded as part of a plugin 514 that can be used with other communication flow solutions (e.g., as part of a CTI solution). The scripts can be loaded locally from each of the communication control servers 510 or iPBXes, or loaded from remote web application server (e.g., using with HTTP(s) protocol). The integration of the layers facilitates the ability of a developer to use the (iPBX) data model 512, provider-hosted database(s), third-party application servers 516 and third party database(s) 518 to drive business and communication flow logic and to integrate communications with other capabilities and services.

Figure 6:
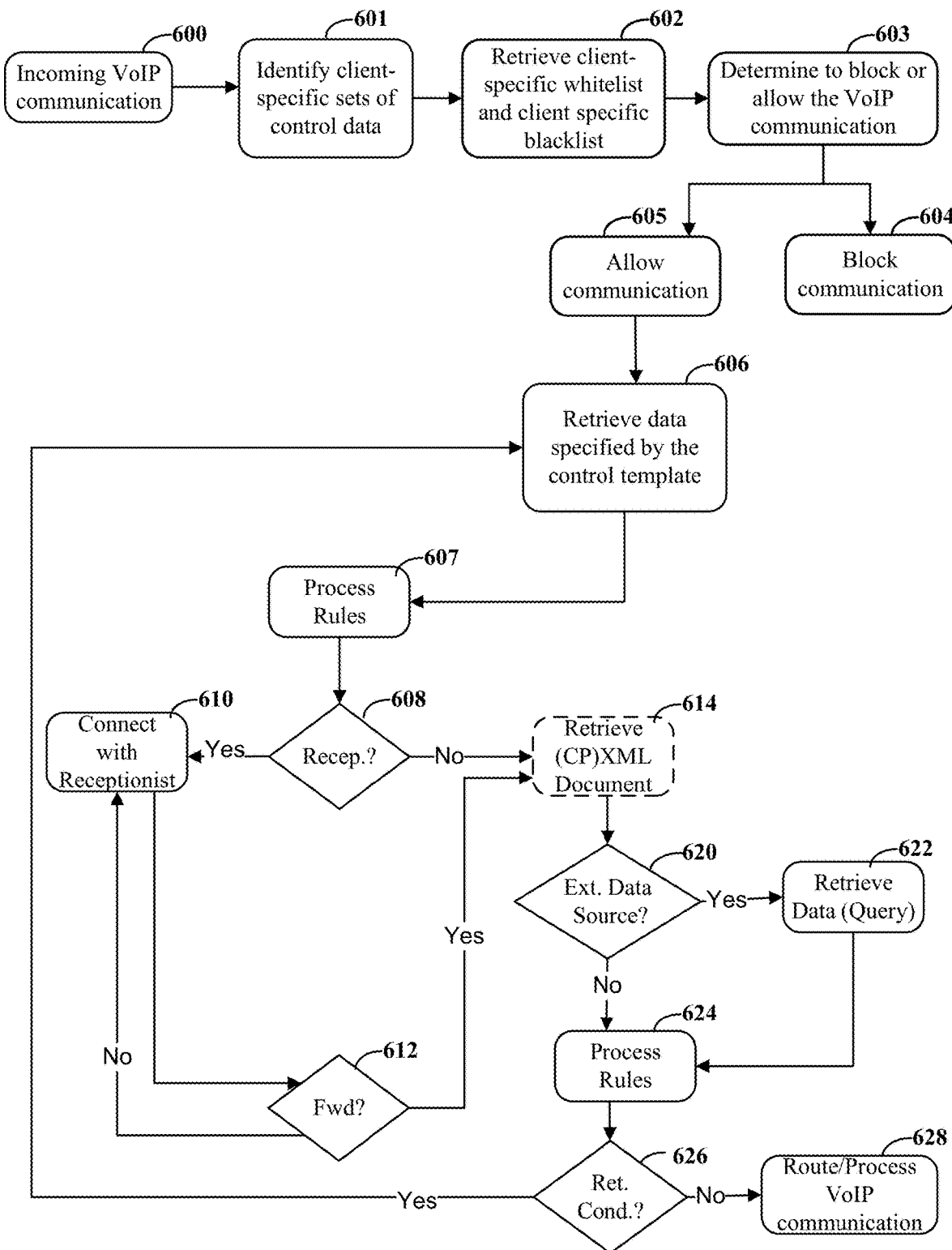
FIG. 6 is a flow diagram illustrating customized communication lists for data communications systems using high-level programming, consistent with embodiments of the present disclosure.

FIG. 6 is a flow diagram illustrating customized communication lists for data communications systems using high-level programming, consistent with embodiments of the present disclosure. The flow begins with an incoming data communications communication, per block 600. Data communications may include data communications, facsimile messages, SMS messages, voice-messages, and other communications delivered over internet protocol networks. The incoming communication information provides data about the number called and may also include information about the calling number (e.g., Caller ID). The called number may correspond to one of multiple accounts that are supported by a receptionist (or by several receptionists), for example, operating on behalf of a client entity subscribing to a set of data communications services.

In response to receipt of the communication, a communication control engine (e.g., 114 of FIG. 1 at the services provider side of the interface) can identify client-specific sets of control data per block 601. As discussed herein, a first level of communication processing rules may be provided by the data communications service provider to the subscribing client entity in the form of an XML-type document for receipt and interpretation by the communication control engine. A second level of communication processing rules may be provided by the client entity to the data communications service provider in the form of an XML-type document which includes client-specific whitelists and blacklists, as described herein. The communication control engine may retrieve the client-specific whitelists and the client specific blacklists per block 602. The communication control engine may subsequently determine whether to block or route the incoming data communications communication, at 603, based on at least one property of the data communications telephone communication and the client-specific sets of control data. In response to the determination indicating to block the data communications, the communication control engine may execute instructions (which when implemented, cause the engine) to block the routing of the data communications at block 604. In response to the determination indicating permission to route the data communications at block 605, the communication control engine may implement one or more data communications functions specified by the client-specific sets of control data as being conditional upon the retrieved data and the determination whether to route the received data communication.

In particular embodiments, there can also be multiple levels of communication processing rules and optionally with multiple XML-type languages or different sets of instruction sets used in connection with the different respective levels. As a specific example, the communication control engine can use a first (e.g., light-weight) XML derivative document that functions as a plugin module to the communication control engine. Subsequent communication processing rule levels can use documents written with more complex language(s) that can use a superset of commands relative to the first level (e.g., documents that use the second XML derivative). For instance, the communication control engine can identify at least one communication control template that is associated with the incoming communication. The communication control template can be written in a second XML derivative language, and may be common for a plurality of end-users of a client entity, or in some cases, common for a plurality of client entities.

As discussed herein, each communication control template can direct the communication control engine to carry out communication flow and communication functions based upon retrieved data. For example, the template document can contain a number of conditional statements that specify different actions depending upon the retrieved data. The communication control template can direct the communication control engine to retrieve additional instructions written in the second programming language at block 606 that defines communication processing functions for a particular end-user. For example, a client entity having a plurality of branch locations may generate a communication control template defining default communication processing functions for each branch location. The communication control template may direct the communication control engine to retrieve instructions for communication processing functions for each particular branch location. The communication control template may be created by each respective client entity and provided to the data communications provider using a customization tool (e.g., interface), as described herein. Moreover, the communication control for each respective client entity may be edited and/or replaced. For instance, the client entity may provide a revised communication control template, including revised communication processing functions selectable by the plurality of end-users, and/or new communication processing functions that may be selected by the plurality of end-users.

Consistent with certain embodiments, the communication control engine can rely upon external data source(s). As discussed herein, several different manners may be used so that data can be efficiently retrieved from the external data sources. For example, XML-type documents themselves can be retrieved from an external source. For example, the identified communication control template might direct the communication control engine to send requests to a web server and get WL-type documents for processing. The communication control engine can interpret a received XML-type document to identify (XML) language building blocks that are then rendered (executed). Each building block can define logic relating to one or more functions, such as functions for voice, communication control, and flow control logic. The requests can include relevant information about the incoming communication, such as the called number and the caller ID. The XML-type document may define query requests that the communication control engine generates in order to retrieve data from databases or other sources of data. A query could be formatted for consistency with the source of the data (e.g., JSON) to retrieve data from third party application servers or from the data communications server provider's cloud database).

The communication control engine processes the rules defined by the XML derivative documents along with any retrieved data, per block 607. One result of the processing can be a determination of whether or not to route the communication to a receptionist, per block 608. Upon connection with a receptionist, per block 610, the communication can remain connected until the receptionist chooses to forward the communication to the called party (or to another party), per block 612. Rules pertaining to the receptionist, such as language spoken and/or hours implemented, may be defined in a communication control template for a plurality of branch locations, and further defined using XML derivative documents for a particular branch location.

According to some embodiments, communications that either have not been intercepted (e.g., bypassed the receptionist) or have been forwarded by the receptionist, can be processed according to another set of XML documents, per block 614. In particular implementations, the documents retrieved per block 614 can be written using a language that has an instruction set that is a superset of the instruction set for the language used by data communications service provider (e.g., a second XML derivative language being a superset of the first XML derivative language). The increased size of the instruction set can facilitate more complex communication processing and routing operations to be defined. For example, the first XML derivative language can be used primarily for determining initial routing decisions for all incoming communications. This routing decision can be made by a communication control engine located at a communication routing switch that can route the incoming communication to any of a plurality of IP PBXs. Each IP PBX can have a corresponding communication control engine and second XML derivative document(s). The second XML derivative documents might invoke more complex communication processing operations, such as triggering computer telephony integration (CTI) modules used by the called party or playing audio that is appropriate for the particular communication (e.g., audio that is selected based upon factors indicated by the second XML derivative document).

Consistent with certain embodiments, the communication control engine(s) can rely upon external data source(s), per blocks 620 and 622. As discussed herein, there are several different manners by which data can be retrieved from the external data sources, per block 622. The communication control engine(s) processes the rules defined by the XML rules along with any retrieved data, per block 624. Based upon the rules, the communication can be routed and processed, per block 628.

In some embodiments, the communication can still be routed back to a receptionist, or rerouted to a different IP PBX. In particular, the second XML derivative document and/or communication control template could indicate that the communication be processed again by the first communication control engine as noted by the connection between blocks 626 and 606. The communication control engine of the IP PBX can provide information that adjusts how the communication is routed during this second pass through the first communication control engine (e.g., thereby avoiding a loop condition). For instance, a general communication interception rule for a location, defined by a communication control template, may bypass the receptionist for all communications at a particular time of day. A particular communication would then be sent to an IP PBX that corresponds to the account of the dialed party. The second XML derivative document for the corresponding account might include conditions that route the communication back to a receptionist. For instance, the second XML derivative document could check the online status of the contacted party relative to an application running on their computer. In particular, the second XML derivative document might be directed to an API that provides the online status. The conditional routing could specify that if the individual is currently in a meeting the communication should be routed back to the first communication control engine with instructions to route the communication to an alternative party or to a receptionist.

MORE DETAILED AND/OR EXPERIMENTAL EMBODIMENTS

Consistent with the above-characterized embodiments, various other embodiments are based on implementations which involve alternative features and/or involving a type of programming language which is different than disclosed above for use as part of the above embodiments. Accordingly, the present disclosure is not necessarily limited to specific methods, systems, applications and devices in and stemming from the specific embodiments disclosed herein. Other related embodiments and aspects can be fully incorporated in each such disclosed (contemplated/suggested) embodiment. Some of these aspects and embodiments would be recognized from the following discussion.

In certain embodiments, the client-specific control engines provide client-specific control data to the data communications server(s) via an interface protocol platform that characterizes the format in which the client-specific sets of data are communicated to the data communications server. According to various embodiments, data is communicated via the interface protocol platform using high-level programming language instruction set. The high-level programming language instruction set allows a programmer access to the data communications server(s) (or PaaS computing server(s) providing remote services) by way a controlled and limited set of communication control operations and functions. The limitations on the operations can be particularly useful for allowing programming control to be placed into the hands of different customers of the provider of the data communications servers. For example, the provider can update or make other changes to how the data communications servers are configured without requiring modification to documents written to use the high-level language, which might otherwise be required to account for the changes. Moreover, the data communications servers and their data can be protected from poor programming decisions (intentional or otherwise) by tightly controlling the extent that the documents provide control or access the inner workings of the data communications servers.

Consistent with the above discussion, at the client side of the data communications services, the client's computer-based processing (e.g., by the client-specific control engine) generates and submits control (routing/data-communication) directives for assessment and use by the data communications service provider. In a typical implementation, these directives can be realized using codes or one or more commands (or a script of program-created commands). As examples, such codes or command sets can be implemented using a variety of programming control approaches. These approaches include, for example, a programming language (such as C++, XML, JAVA, HTLM, SQL, etc.) common to both the client-specific control engine and to the data communications service provider, which receives the directives (submitted from the client side) for adjusting the data communications services being provided to the submitting client. In some implementations, look-up tables with codes/commands as entries can be used by the client engines each time a service change is needed. The entries can be pre-generated by the service provider for use by the client, manually entered by either the client or an installer, and/or generated by logic circuitry (such as implemented in hosted FPGA fabric). For instance, entries may be generated by logic circuitry based on a set of limited assumptions and conditions applicable to that specific type of client and its service expectations/subscription (e.g., no more than 10 extension phone lines in any designated geographic region, only 2 designated extension lines permitted to videoconference, etc.).

By using a common interface protocol (e.g., the programming language, codes or command sets) which is understood by the data communications service provider, authentication and updating for added (telephony) services is readily achieved automatically and remotely without burdening the data communications service provider with cost-intensive set up procedures. Depending on the level of services being added/changed for each client, and/or depending on the client's manual-operator and/or automated technology, the control directives can be generated and submitted in various (coded) ways such as described above and also, for example, by dial tone input generated remotely on behalf of each client, by smartphone app specific to the client, by voice recognition, or combinations thereof. The client engine can also prompt the user to effect and select decisions upon certain client-generated or provider-prompted events. Consistent with the instant disclosure, control directives can be generated by the client (and/or client engines) based on various criteria/parameters According to embodiments of the present disclosure, the data communications servers can be configured to use different high-level programming languages for different functions, where each programming language has a different set of commands. For example, a first high-level programming language can be used to create documents that control communication routing decisions for high volumes of communication traffic, as might occur at the edge of a data communications provider's system. These communication routing decisions can, for example, identify a particular branch office or an IPBX of a particular customer. The identified IPBX might then have additional documents written to communicate using a second high-level programming language that is tailored toward more specific communication processing capabilities that might be associated with a particular account or another identifiable grouping. The distinction between the two programming languages can be particularly useful in terms of improving the scalability of the system. For instance, the language used for communication routing decisions can be relatively light weight, with fewer commands and capabilities. In particular implementations, the first (communication routing) language can contain a subset of the commands available in the second (communication processing) language.

According to various embodiments, the high-level, domain-specific programming language(s) are defined using a markup language as the basis for the language structure. More particular embodiments use extensible markup language (XML). An XML model defines the constraints on the high-level language, including defining the set of valid commands that can be carried out by the data communications servers. Within these constraints, a customer can write XML code that self-describes the building blocks used in the customer's particular application. Another aspect of the communication processing XML is that it allows for various different data structures to be embedded into the XML document or file. For example, a script written in JavaScript can be embedded as character data that the data communications servers are configured to identify and execute. Unless otherwise stated, the use of XML in connection with various embodiments does not necessarily limit the corresponding embodiments, such as limiting the embodiments to the use of only an XML-based language(s).

Particular implementations relate to the use of two separate languages, one that can be used for initial communication routing and the other for providing more complex and specific communication processing functions. In various portions of the present disclosure, the two languages are referred to as either communication processing XML (CPXML) or communication routing XML (CRXML).

The data communications servers providing the underlying function for the PaaS can be configured to utilize a high-level, domain-specific programming language. A particular example language is referred to as Communication Processing eXtensible Markup Language (CPXML). CPXML refers to a communication processing language which defines the message exchange protocol between a communication control server (e.g., an IntraSwitch with a CPXML Engine) and other sources of information, such as databases, web applications, authentication servers, and servers providing various communication-related services. CPXML can allow developers to program communication processing logic or service execution logic with both XML building blocks and JavaScript/TCL, or other scripting languages. In certain implementations, CPXML allows PaaS customer developers to program and integrate data communications flow (e.g., as provided by a cloud-based data communications service) with customer or third party application servers and databases.

A CPXML engine can send requests to a web server and get XML (CPXML) responses for processing, thereby operating in a stateless manner that is similar to HTML/Internet browser. The CPXML engine can interpret a received CPXML response, and render (execute) CPXML building blocks. Each building block can define functions relating to voice, communication control, and flow control logic. The CPXML engine may also execute other types of code, such as JavaScript, to create dynamic content (e.g., dynamically generated CPXML) for client-side flow control. Each CPXML document may have URL links to a web server for iterative processing, or it may include query requests for retrieving data from various sources. A query could be formatted for consistency with the source of the data (e.g., by using JavaScript Object Notation (JSON) to retrieve data from third party application servers or from the data communications server provider's cloud database). This information can then be used to drive communication flow or communication control decisions.

CRXML defines a limited set of commands to the communication routing logic that allows a customer to define how a communication is initially routed. Maintaining the CRXML as a limited set of simple building block commands can help with the efficiency of the communication control switch. For example, the communication control switch can be located at the perimeter of the data communications provider's routing network, which implies that it may be required to handle a large volume of data communications telephone communications. The efficiency in processing the large volume of communications can have a significant impact on the performance of the system.

Consistent with various embodiments, the CRXML documents specify a first level of communication routing and simple communication processing that are carried out by the communication control switch. For example, a communication control switch may provide communication routing options for multiple branch offices or locations and for multiple PBXs that support the branch locations. Each branch and PBX may have multiple customer (user) accounts associated therewith. CRXML documents can be used to determine the routing for a communication by identifying a particular branch location, a particular PBX and particular data communications customer account to use in subsequent communication processing and routing. The initial routing decision is indicated by the arrow labelled as "account selection," which shows the passage of control to a communication processing engine.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" (also sometimes "logic circuitry" or "module") is a circuit that carries out one or more of these or related operations/activities (e.g., a communication control circuit). For example, in certain ones of the above-discussed embodiments, one or more modules are discrete logic circuits, computer processing circuits, or programmable logic circuits configured and arranged for implementing these operations/activities, as in the blocks shown in the figures.

Similarly, it will be apparent that a server (e.g., providing a corresponding software platform) includes a computer processing circuit that is configured to provide services to other circuit-based devices. Moreover, a data communications endpoint device (or endpoint) includes a communications circuit and (computer) processing circuits which are configured to establish data communications sessions with other endpoint devices (e.g., personal computers, IP-enabled mobile phones, and tablet computers). In certain embodiments, such a processing circuit is one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes), the activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. An apparatus comprising:
   a data communications server configured to interface with remotely-situated client entities, via wide-band networking, using a first programming language that relates to a protocol between the data communications server and data sources, the data communications server configured as a private branch exchange (PBX) that performs communication routing; and
   a communication control circuit integrated communicatively with the data communications server, to:
      identify, in response to receipt of incoming data communications directed to a particular client entity, client-specific sets of control data, wherein the client-specific sets of control data are derived from instructions written in a second programming language, provided from a communication endpoint operated on behalf of the particular client entity, that is compatible with the first programming language, the first and second programming languages to facilitate limited use of the data communications server via a limited set of communications control operations and functions in each of the client-specific sets of control data; and
      determining the incoming data communications have a feature which is indicated by the client-specific sets of control data and for which the client-specific sets of control data instructs that communications routing be blocked and, in response executing instructions for blocking routing by the PBX of the incoming data communications.

2. The apparatus of claim 1, wherein the limited set of communications control operations and functions in each of the client-specific sets of control data are to allow for programming control to be performed on behalf of remotely-situated client entities, and are to prevent improper programming performed on behalf of the remotely-situated client entities from affecting services provided by the communications control circuit, and wherein the first and second programming languages are to permit communications control changes to be made by remotely-situated client entities without requiring that scripts written in the first programming language or the second programming language be modified to account for the changes.

3. The apparatus of claim 1, wherein the communication control circuit is to, in response to communications routed through the communication control circuit, access stored sets of client-specific routing instructions stored for the communication control circuit according to the client-specific sets of control data respectively associated with the incoming data communications.

4. The apparatus of claim 1, wherein sets of client-specific routing instructions are stored for the communication control circuit and are arranged via a hierarchy to specify the client-specific sets of control data depending upon an indication of a specific branch ID associated with the data communications routed through the communication control circuit, and in response, to perform a routing decision depending on the specific branch ID.

5. The apparatus of claim 1, wherein the client-specific sets of control data include a client-specific list of approved calling numbers from which data communications may be received by the particular client entity, and a client-specific list of blocked calling numbers from which data communications may not be received by the particular client entity.

6. The apparatus of claim 1, wherein the communication control circuit is configured and arranged to determine whether to route the incoming data communications based on dynamic communications features specified in the client-specific sets of control data, the dynamic communications features including at least one of a date or time of day of the data communications, a location of the particular client entity, and a location of origination of the data communications.

7. The apparatus of claim 6, wherein the communication control circuit is configured and arranged to determine whether to route the incoming data communications based on a workload of a server operated on behalf of the particular client entity.

8. The apparatus of claim 1, wherein the communication control circuit is to control routing of communications via the PBX by recognizing whether a feature associated with the incoming data communications indicates permission to route the incoming data communications.

9. An apparatus for communications over one or more wide-band networks, the apparatus comprising:
   a data communications server configured to interface with remotely-situated client entities using a first programming language that relates to a protocol between the data communications server and data sources, the data communications server configured as a private branch exchange (PBX) that performs communication routing; and
   a communication control circuit integrated communicatively with the data communications server, to:
      identify, in response to receipt of an incoming data communications directed to a particular client entity, client-specific sets of control data that further relate to a message exchange protocol between the data communications server and the data sources, wherein the client-specific sets of control data are derived from instructions written in a second programming language, provided from a communication endpoint operated on behalf of the particular client entity, that is compatible with the first programming language, the first and second programming languages to facilitate limited use of the data communications server via a limited set of communications control operations and functions in each of the client-specific sets of control data received over the message exchange protocol; and control communication routing by the PBX and for the data communications by:

determining whether to route incoming data communications in response to a comparison of at least one feature of the incoming data communications and the client-specific sets of control data;

in response to the determination indicating permission to route the incoming data communications, identifying at least one data source that corresponds to a communication property for the incoming data communications, and providing communication control functionality for the incoming data communications using the data source;

in response to the determination indicating to block the data communications, executing instructions to block the routing of the data communications; and wherein the client-specific sets of control data include a client-specific list of approved calling numbers from which data communications may be received by the particular client entity, and a client-specific list of blocked calling numbers from which data communications may not be received by the particular client entity, and a database server configured to interface with the data communications server and to maintain the client-specific sets of control data, including the list of approved calling numbers and the list of blocked calling numbers for each respective client entity, in a hierarchy in which lower level client entities inherit the list of approved calling numbers and the list of blocked calling numbers from higher level client entities.

10. The apparatus of claim 9, wherein the database server is configured and arranged to maintain a first list of approved calling numbers for the particular client entity and a second list of approved calling numbers for a branch location of the particular client entity, the second list of approved calling numbers including the first list of approved calling numbers and additional approved calling numbers particular to the branch location.

11. The apparatus of claim 10, wherein the database server is configured and arranged to maintain a third list of approved calling numbers for an end-user of the branch location, the third list of approved calling numbers including the second list of approved calling numbers and additional approved calling numbers particular for the end-user.

12. The apparatus of claim 9, wherein the database server is configured and arranged to maintain a first list of blocked calling numbers for the particular client entity and a second list of blocked calling numbers for a branch location of the particular client entity, the second list of blocked calling numbers including the first list of blocked calling numbers and additional blocked calling numbers particular to the branch location.

13. The apparatus of claim 9, wherein the first and second programming languages are to permit communications control changes to be made by remotely-situated client entities without requiring that scripts written in the first programming language or the second programming language be modified to account for the changes.

14. A method for use in a data communications system, comprising:

receiving by a communication control circuit of a data communications server, data communications intended for a particular client entity of a plurality of remotely-situated client entities, the data communications server configured and arranged to interface with the client entities using a first programming language that relates to a message exchange protocol between the data communications server and data sources;

identifying client-specific sets of control data derived from instructions written in a second programming language, provided from a communication endpoint operated on behalf of the particular client entity, that is compatible with the first programming language, the first and second programming languages to facilitate limited access to and use of the data communications server via a limited set of communications control operations and functions in each of the client-specific sets of control data received over the message exchange protocol, that further relates to the message exchange protocol between the data communications server and the data sources, wherein the client-specific sets of control data include a client-specific whitelist and a client-specific blacklist associated with the particular client entity which respectively define conditions under which data communications may or may not be received by the particular client entity;

executing the client-specific sets of control data to retrieve data from at least one data source and to determine whether to route incoming data communications;

implementing one or more data communications functions specified by the client-specific sets of control data as being conditional upon the retrieved data and the determination whether to route the received data communications; and wherein the limited set of communications control operations and functions in each of the client-specific sets of control data are to allow for programming control to be performed on behalf of remotely-situated client entities.

15. The method of claim 14, including determining to block or allow the received data communications based on at least one of a time of day of receipt of the data communications, a location of origin of the data communications, and a workload of the particular client entity at a time of receipt of the data communications.

16. The method of claim 14, including determining to block or allow the received data communications according to client-specific blacklists and client-specific whitelists defined at multiple hierarchical levels of the particular client entity.

17. The method of claim 14, wherein the received data communications include data telephone communications and non-voice data communications applications.

18. The method of claim 14, wherein the first and second programming languages are to permit communications control changes to be made by remotely-situated client entities without requiring that scripts written in the first programming language or the second programming language be modified to account for the changes.

* * * * *